Dec. 14, 1965          A. BUR          3,222,934

CAR DUMPER SAMPLING MEANS

Filed Feb. 4, 1963          2 Sheets-Sheet 1

INVENTOR.
Armand Bur
BY Robb & Robb
Attorneys.

Dec. 14, 1965 A. BUR 3,222,934
CAR DUMPER SAMPLING MEANS
Filed Feb. 4, 1963 2 Sheets-Sheet 2

INVENTOR.
Armand Bur
BY Robb & Robb
Attorneys.

United States Patent Office 3,222,934
Patented Dec. 14, 1965

3,222,934
CAR DUMPER SAMPLING MEANS
Armand Bur, 1213 North Ave., Parma, Ohio
Filed Feb. 4, 1963, Ser. No. 255,787
7 Claims. (Cl. 73—421)

My present invention relates to car dumper sampling apparatus such as that illustrated in my United States Patent No. 2,533,090 issued December 5, 1950, and more particularly, my present invention pertains to improvements in the construction of the sampling tubes of the general type disclosed in my aforesaid patent.

The primary object of my invention is to provide sampling means of the general type referred to which is capable of much more accurate sampling of the materials to be tested than was heretofore possible.

A more specific object of the invention is to provide means for adjusting the positioning of the receiving ports or openings of the sampling tubes with respect to the flow of materials as the same are dumped from a car or other container from which such samples of said materials are to be taken, whereby said ports or openings in the sampling tubes may be positioned in any desired manner with respect to such flow of the materials being sampled so as to obtain a more accurate sample of said materials from such car or container.

A further specific object of the invention is to provide means for directing the sampled materials into the ports or opening of the sampling tubes in such manner as to insure that the sample materials received by the sampling tubes are uniformly obtained in such manner as not to discriminate for or against material particles of certain sizes.

A still further object of the invention is to provide means operative during the sample receiving period to segregate the materials received by the sampling tubes through their respective ports so as to enable each port to receive a quantity of material truly representative of the material directed toward the respective port during the sampling cycle.

Sampling apparatus of the type referred to as previously used employed sampling tubes wherein the positioning of the materials receiving ports or openings therein was permanently fixed and thus were not capable of being adjusted with respect to the direction of flow of the materials being sampled after initial installation of the sampling tubes. The fixed positioning of the materials receiving ports or openings of the sampling tubes of apparatus heretofore used not only made it difficult to properly position the said ports or openings initially but of course did not provide the advantages of adjustment for repositioning of the ports or openings for various purposes.

Another problem that arose with previously used equipment of this type involved the fact that larger particles of material striking the sampling tubes at the periphery of the ports or openings thereof tended to be rejected from inclusion in the samplings in a disproportionate manner. The provision of housings or so-called "cutter boxes" defining the effective opening area of the respective ports and offstanding from or protruding from the sampling tube, in accordance with my invention, enables direction to the receiving ports or openings of a truer section of the materials flow stream flowing toward the respective sampling tube opening during any moment of the sampling cycle, minimizes the otherwise abnormal rejection of a disproportionate quantity of larger particles striking the periphery of the sampling tube openings, and thus results in a more accurate sampling.

Another problem that arises in the use of equipment of this general type heretofore used is that the sampling tube tends to fill up with material received through the first of the plurality of ports exposed to the stream of material being sampled so that as the sampling cycle progresses to the point where the stream of material is received through another of the ports of the sampling tube, the said tube may be filled with such a quantity of material from the first port that a properly proportioned quantity of material which should be received through the second port of the sampling tube cannot be received therein thus preventing the obtaining of the desired accuracy of sampling. This problem is obviated by the provision according to my invention of means for segregating the materials received through the respective openings of a given sampling tube. Specifically, as disclosed herein, such segregating means may take the form of a swinging gate which is properly disposed in open and close positions respectively by gravity during the operation of the car dumper for dumping and later restoring the car to normal position.

Other objects, advantages and features of the invention will become apparent from the following detailed description of the invention, taken in conjunction with the accompanying drawings, in which.

In the accompanying drawings I have illustrated a conventional type of car dumper such as that shown in greater detail in my aforesaid Patent No. 2,533,090 and which may embody a similar arrangement of the sampling tubes to that shown in said patent, the same being referred to for illustrative purposes, since neither the details of the car dumper nor the specific arrangement of the sampling tubes is an essential feature of the present invention.

Figure 1:
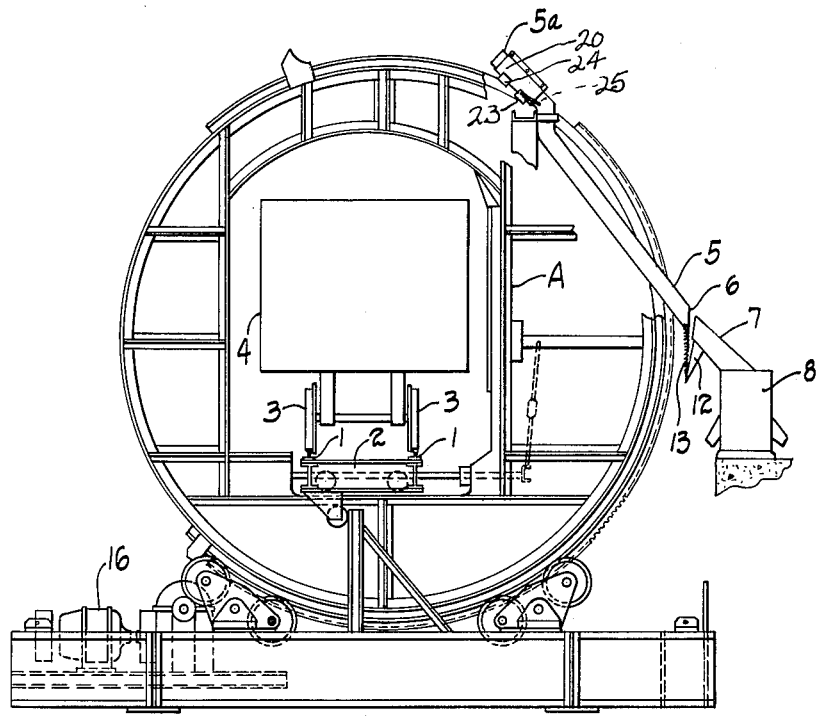
FIGURE 1 is an end view of a car dumper embodying my invention, a portion being broken away and showing one of the sampling tubes employed therein.

As seen in FIGURE 1 the car dumper may largely be made up of the circular dumping body or frame generally indicated at A, the same equipped with a suitable track section comprising the tracks 1 mounted upon a laterally slidable base frame 2, said track section of course supporting the wheels 3 of the freight car 4 when the car has been moved into place on the dumper A and is ready to be rotated for the dumping operation.

The dumper A may be equipped with the customary control mechanism and grappling features for engaging the car 4 in order to maintain the same rigidly held in the dumper A during the dumping operation. The details of the car dumper as illustrated are immaterial to my invention because they are conventional and well known to those versed in the art of dumping machinery of this class. I do not, therefore, describe such details for the reason above stated.

The sampling apparatus of my invention comprises a sampling pipe unit which is made up of one or more sampling pipes 5 that are rigidly mounted upon the dumper A at one side of the latter, being suitably supported by bracket and other attachment means of any substantial nature to maintain the sampling pipes in place on the dumper when the said dumper is rotated for dumping operation and for restoring it to its normal position with the emptied car upright.

The sampling pipe unit may comprise one or more sampling pipes 5 and where, as in the case of my aforesaid patent construction, the said sampling pipe unit employs a plurality of sampling pipes 5, said pipes will converge toward their lower ends into a delivery or discharge section 6, the open discharge end of which is disposed relatively close to a chute 7 that is mounted on a grinder 8 which is positioned at the side of the dumper on which the sampling pipes are arranged and supported in any suitably stationary manner alongside the dumping machine. The grinder 8 may be a type of such machine operated by a suitable motor (not shown) and is a conventional grinder such as employed for reducing the materials received therein from the sampling pipes to a condition of preparation preliminary to laboratory testing of the materials. In respect to coal, the sampling materials are tested for their B.t.u.'s after the known manner of testing such materials.

A sliding gate is provided at the lower end of the discharge portion 6, which gate is normally arranged or positioned by action of the spring 13 to close the lower end of the discharge portion 6 so as to retain the materials received in the sampling tubes thereabove, during dumping rotation of the dumper A. As the dumper is restored to its normal position of FIGURE 1 (non-dumping position), an abutment on said gate is engaged by the bracket 12 on the chute 7 serving to open said gate to enable sampled materials to pass from the discharge end 6 to the chute 7 of the grinder 8, said bracket 12 serving to open said gate against the action of the spring 13.

The upper end extremities of the sampling tubes 5 are closed. However, the upper sample receiving portions 5a of said tubes are each provided with an elongated opening 5b therethrough. A split cylindrical sleeve 20 is arranged to encircle each of the sampling tubes 5 for sliding movement thereon at the uppermost sample receiving portion 5a thereof, each sleeve 20 being of an axial length greater than the axial length of the opening 5b in the respective sampling tube so as to cover said opening in all positions of sliding adjustment of said sleeve 20 axially of the respective tube 5. The respective sleeves 20 are each provided with two or more openings therethrough, said openings being designated 21 and 22, which register with the opening 5b in the tube 5 when the sleeve is mounted thereon. The said openings 21 and 22 are spaced from one another axially of the sleeve and the respective tube and effectively constitute the sample receiving openings 21 and 22 therefor. Each of the openings 21 and 22 of the respective sleeve is provided with an offstanding portion respectively designated 23 and 24 protruding outwardly from the sleeve and extending around and defining the periphery of the respective openings 21 and 22, said offstanding portions 23 and 24 being referred to as cutter boxes. The said portions 23 and 24 may be formed of sheet metal, as in the case of the sleeves 20 and tubes 5, and suitably formed and secured to the sleeves in any desired manner.

The sleeves 20 are each formed with flanges 20a and 20b having openings therethrough to receive bolts 29 having threaded cooperation with nuts or like fastening means, whereby said bolts may be operated to draw together the flanges 20a and 20b to tighten the respective sleeve 20 upon the respective tube 5 in the desired position of axial adjustment relative thereto.

Figure 2:
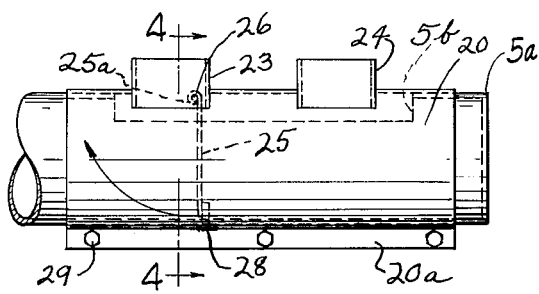
FIGURE 2 is a side elevation of the upper end portion of one of the sampling tubes.
Figure 4:
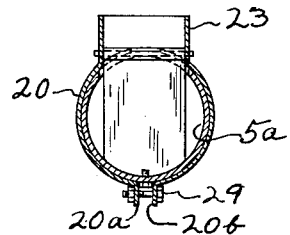
FIGURE 4 is a sectional view taken on the line 4—4 of FIGURE 2.
Figure 3:
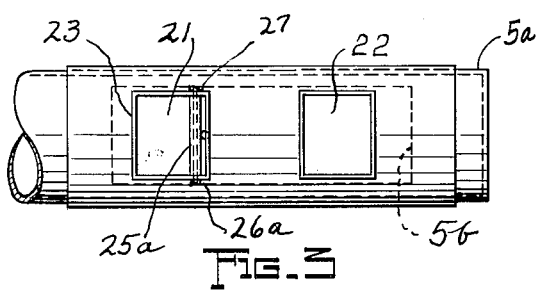
FIGURE 3 is a view taken at right angles to that of FIGURE 2 and looking toward the sample receiving ports of the sampling tube.

Further in accordance with my invention, there is provided means for segregating the samples of material received by the respective sample receiving openings 21 and 22 of the respective sampling tube 5. As illustrated in the drawings, this segregating means may take the form of a swinging gate 25 arranged to swing to open and close positions within the tube 5 so that in its closed position such as shown in FIGURES 2 and 4, the samples of materials received by the respective openings 21 and 22 are segregated, and in the open position of the gate 25 as shown in FIGURE 1, the materials received by both sample receiving openings 21 and 22 are permitted to pass down the respective sampling tube to the discharge portion thereof.

Where the sampling tubes embody the sliding sleeve 20 construction, the swinging gate 25 will be arranged to be carried by and pivotally connected to said sleeve. If the sliding sleeve 20 is not employed, the swinging gate 25 will be pivotally connected directly to the sampling tube 5. As illustrated in the drawings appended hereto, the gate 25 is pivoted to the sleeve 20 at the sample receiving side thereof and for this purpose the gate 25 is provided with a bearing portion 25a which receives a pivot rod 26 which conveniently may be arranged to extend through opposite sides of the cutter box 23 at the uppermost end thereof, referring to its relationship thereto when the sampling tube is in normal non-dumping position. The pivot rod 26 may be provided with a head 26a at one end and threaded at the opposite end for cooperation with a nut 27 for securing the rod 26 to the cutter box 23.

Figure 5:
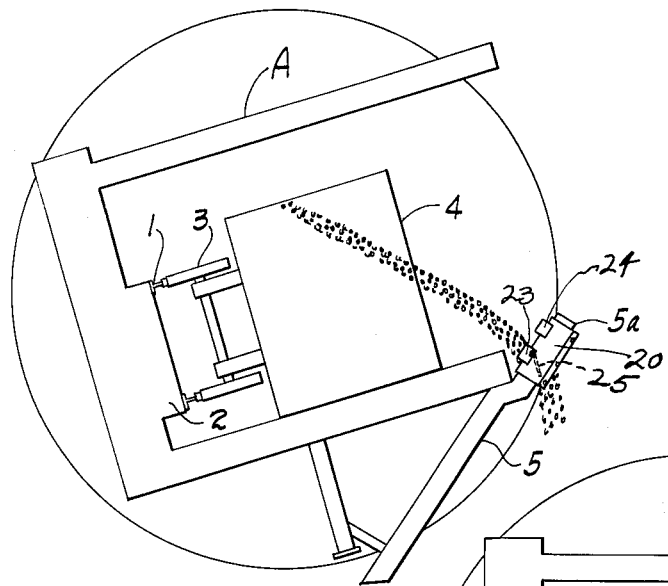
FIGURES 5, 6 and 7 are diagrammatic views illustrating the car dumper rotated to different positions in its 150 degree arc of dumping rotary movement, whereby the sample receiving openings of one or more sampling pipes are brought into play at different times controlled by the angle of flow of material from the car incident to the rotative action of the dumper unit.
Figure 6:
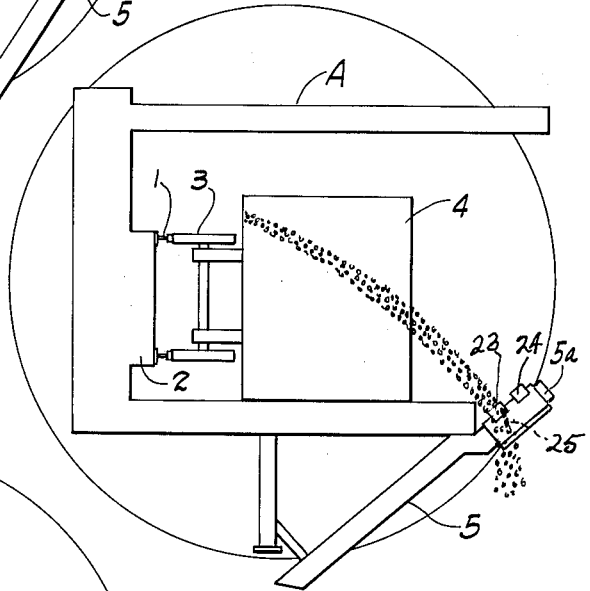
Figure 7:
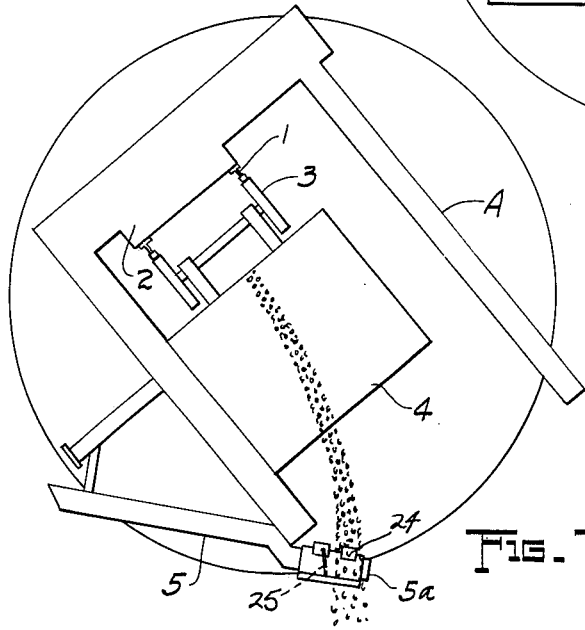

In operation, it will be understood that the car dumper A is in normal non-dumping position as shown in FIGURE 1 when a coal car such as 4 passes thereinto on the rails 1. With the coal car 4 suitably clamped in the dumper A, the latter is then rotated in a clockwise direction as illustrated in FIGURES 5, 6 and 7 for the dumping operation. At a certain position of such clockwise rotation of the dumper A, the flow of material being dumped from the car 4 will cause a sampling of such material to fall into the lowermost sample receiving opening 21 and during a short arc of the rotative movement the said dumped materials will continue to flow into said opening 21 into the tube 5. Thereafter as will be apparent during a short arc of movement the dumped materials will not pass into either of the openings since the flow will strike the tube 5 at a point between said openings. FIGURE 5 shows the rotative position of the dumper A when the material is flowing into the said lowermost opening 21. Subsequently when the dumper A has rotated further to a position such as that of FIGURE 7 said material will similarly flow into the uppermost sample receiving opening 22 during a short arc of the clockwise rotative movement of the dumper A. Thus a sampling of the materials from different portions of the load of the dumped car will be taken in the operation of the dumping apparatus.

It will be understood that the provision of the adjustable sleeve 20, in accordance with my invention, not only provides flexibility of positioning of the sample receiving openings in the sampling tubes 5 but facilitates proper adjustments of the positioning of such sample receiving openings at the time of installation of the sampling tubes on the car dumper apparatus, or at any time after such installation, whereby it is not necessary to rely either upon precalculated prediction of the best probable positioning of the sample receiving openings or upon a trial and error procedure of forming the openings after installation of the sampling tubes. By the use of my sliding sleeve construction, the same can readily be adjusted axially of the sampling tube 5 after installation of the latter, to position the sample receiving openings in the desired position in accordance with observed flow of the materials as such flow occurs during actual car dumping operation. Also of course the employment of my sliding sleeve construction enables readjustment of the sample receiving openings after installation of the sampling tubes to enable samples to be obtained from different portions of the load being dumped depending upon sampling requirements of a particular user. Moreover, this adjustable sliding sleeve construction enables repositioning or different positioning of the sample receiving openings of different sampling tubes installed on a particular car dumper so that a greater variety or dispersal of samples from the load may be obtained by the use of the same number of sampling tubes than was heretofore possible.

The provision of the cutter boxes 23 and 24, in accordance with my invention, enables more accurate sampling of the material dumped since it facilitates directing into the sample receiving openings a truer section of the actual material flow than would otherwise be possible in that the relatively thin outwardly protruding edges of said cutter boxes act in a sense to cut through the flow stream and direct into the sample receiving openings a representative sampling of the materials in that section of the flow stream with less tendency to discriminate against particles of material of larger size as is the case with sampling apparatus previously used. In this connection it has been found that with sampling tubes previously used without such cutter boxes the material striking the sampling tube at the periphery of the sample receiving openings tended to cause a disproportionate quantity of the larger or heavier particles in the flow stream to be deflected away from the opening, whereas the employment of the cutter box construction disclosed herein enables a more truly proportionate sampling of the materials of various particle sizes to be received within the sample receiving openings since such larger particles striking the thin protruding edges of the cutter boxes will tend to be deflected into the sample receiving openings in a more representative or more truly proportionate manner.

It will be seen upon reference to the drawings herein that when the dumper A is in normal non-dumping position the swinging gate 25 will swing by gravity to open position so as not to obstruct the flow of sampled materials from the sample receiving section 5a down the tube 5 to the discharge portion 6. It will likewise be seen that as the dumper A is rotated in clockwise direction during the dumping cycle that the swinging gate 25 will swing to close position by the time the flow of dumped materials begin to pass into the uppermost sample receiving opening 22. It may be noted in this connection that a suitable limiting abutment 28 may be provided for limiting the swinging movement of the gate 25 to close position. Such abutment may take the form of a screw or bolt as shown. Thus when the gate 25 is in closed position it prevents the sample materials received through the opening 21 from passing into the portion of the tube 5 which is to receive materials passing through the opening 22 so that a greater quantity of sampled materials can be received in the tube through the opening 22 than would otherwise be the case if the said swinging gate 25 were not provided.

I claim:

1. In combination, a car dumper, a sampling pipe mounted thereon and movable to a material receiving position and having a plurality of sample receiving openings spaced from one another lengthwise of said pipe, said openings being arranged to receive respective samplings of material dumped from a car mounted on said dumper, a gate in said pipe arranged to move to closed position within the pipe between said openings when said pipe is in material receiving position, and means to operate the car dumper to cause material to flow from the car successively into said openings and to restore said dumper to non-dumping position, said gate being movable to open position when the dumper is so restored to non-dumping position whereby to condition the sampling pipe to discharge received samples of said material.

2. The combination of claim 1, wherein each of said openings has a relatively thin wall portion extending around the respective opening and protruding outwardly from said tube.

3. In combination, a car dumper, a sampling pipe mounted thereon and movable therewith to a material receiving position and having a sample receiving opening therein, a sleeve encircling said pipe and the opening therein, said sleeve having an opening therein of smaller size than said pipe opening, said sleeve being adjustable to different positions lengthwise of said pipe with said sleeve opening in register with said pipe opening, said openings being arranged to receive a sampling of material dumped from a car mounted on said dumper, at various positions to which said sleeve opening is adjusted, and means to operate the car dumper to cause material to flow from the car through said openings into said pipe and to thereafter restore the dumper to non-dumping position conditioning the sampling pipe to discharge a received sample of material.

4. In combination, a car dumper, a sampling pipe mounted thereon and movable therewith to a material receiving position and having a sample receiving opening therein, a sleeve encircling said pipe and the opening therein, said sleeve having a plurality of openings therein of smaller size than said pipe opening, said sleeve openings being spaced from one another lengthwise of said pipe, said sleeve being adjustable to different positions lengthwise of said pipe with said sleeve openings in register with said pipe opening, said openings being arranged to receive a sampling of material dumped from a car mounted on said dumper, at various positions to which said sleeve opening is adjusted, and means to operate the car dumper to cause material to flow from the car through said openings into said pipe and to thereafter restore the dumper to non-dumping position conditioning the sampling pipe to discharge a received sample of material.

5. The combination of claim 4, wherein said sleeve openings have relatively thin wall portions extending around the openings and protruding outwardly from said pipe.

6. The combination of claim 5, with a gate in said pipe arranged to move to closed position without the pipe between said sleeve openings when said pipe is in material receiving position, said gate being movable to open position when the dumper is so restored to non-dumping position whereby to condition the sampling pipe to discharge received samples of said material.

7. The combination of claim 4, and a gate in said pipe arranged to move to closed position within the pipe between said sleeve openings when said pipe is in material receiving position, said gate being movable to open position when the dumper is so restored to non-dumping position whereby to condition the sampling pipe to discharge received samples of said material.

References Cited by the Examiner

UNITED STATES PATENTS

| | | | |
|---|---|---|---|
| 1,108,278 | 8/1914 | Thomas | 73—422 |
| 1,641,748 | 9/1927 | Dresser et al. | 73—424 |
| 2,533,090 | 12/1950 | Bur | 73—421 |

LOUIS R. PRINCE, *Primary Examiner.*

JOSEPH P. STRIZAK, RICHARD C. QUIESSER,
*Examiners.*